Nov. 23, 1948.                P. W. ZINGARO                2,454,584
                                HYGROMETER
                            Filed Oct. 2, 1944
Fig. 1.
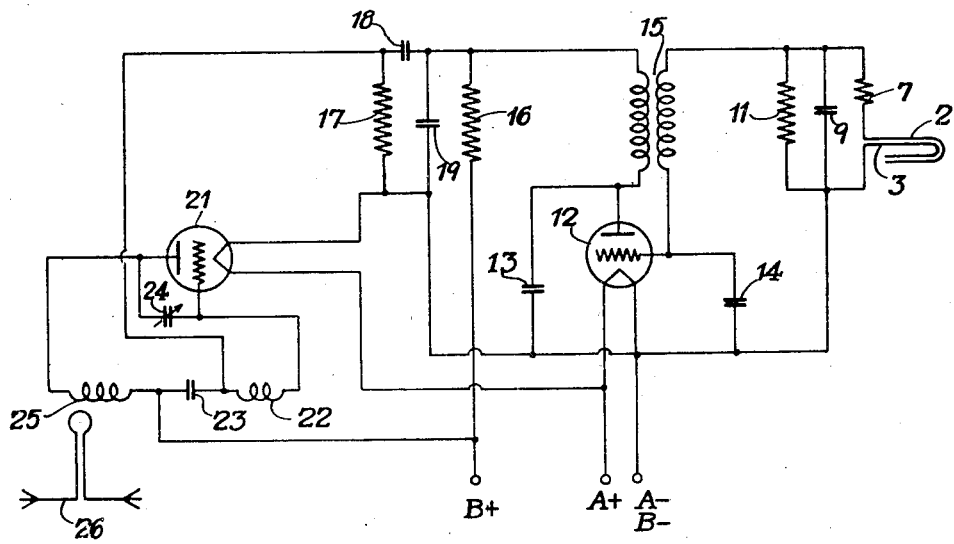
Fig. 3.
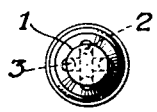
Fig. 2.
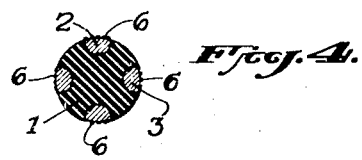
Fig. 4.
INVENTOR.
PLACIDO W. ZINGARO.
BY
ATTORNEY.

Patented Nov. 23, 1948

2,454,584

UNITED STATES PATENT OFFICE 2,454,584

HYGROMETER

Placido W. Zingaro, Hartsdale, N. Y., assignor to Square D Company, Detroit, Mich., a corporation of Michigan Application October 2, 1944, Serial No. 556,795

11 Claims. (Cl. 201—63)

This invention relates to an electrical hygrometer for measuring humidity in response to the change in the resistance of an electrolyte between electrodes.

An object of the invention is to provide an electrical hygrometer employing hygroscopic and electrolytic materials whose resistance is a function of its moisture content and in which the electrolyte renews itself in the event of decomposition by electrolysis when the hygrometer is connected in an electric circuit.

Another object of the invention is to provide an electrical hygrometer using electrodes between which an electrolytic material is placed in which the electrodes are coated with a material for absorbing gases evolved by electrolysis as an electric current passes between the electrodes.

Other objects and features of the invention will be readily apparent to those skilled in the art from the specification and appended drawing illustrating certain preferred embodiments in which:

Figure 1 is a wiring diagram of an electrical system for broadcasting changes in humidity by means of an audible signal.

Figure 2 is a side view of the hygrometer according to the present invention.

Figure 3 is an end view of the hygrometer.

Figure 4 is a sectional view on the line IV—IV of Figure 2.

The hygrometer element illustrated in Figures 2, 3 and 4 comprises an insulating body portion 1 in which are embedded a pair of U-shaped electrodes 2 and 3 having terminals 4 and 5 respectively for connecting the electrodes in an electrical circuit. The outer surface of the body portion of the hygrometer is coated with a hygroscopic and electrolytic gummy material whose moisture content will be a function of the humidity of the atmosphere to which it is exposed and whose resistance as measured between the electrodes 2 and 3 will be a function of its moisture content.

Due to the passage of electrical current between the electrodes 2 and 3 in the operation of the hygrometer, a decomposition of both the water and the electrolyte would occur due to electrolysis. By the decomposition of water, gases are evolved which tend to have a polarization effect on the electrodes. To prevent this, the electrodes are provided with surface coatings of platinum black indicated at 6 for absorbing any gases evolved at the electrodes.

The material with which the hygrometer is coated is preferably a mixture of a hydroxide of potassium, sodium or lithium with glycerine, maintained on the outer surface of the hygrometer by admixture with gum arabic or mucilage. The glycerine is hygroscopic and its moisture content is dependent on the humidity of the atmosphere to which it is exposed. The hydroxide is an electrolyte whose resistance varies with the moisture content. Of the hydroxides of potassium, sodium and lithium, potassium hydroxide is preferred as the electrolyte, as its action is uniform over a relatively wide range of temperatures. Sodium hydroxide and lithium hydroxide are also suitable for use under certain conditions, but the range over which they are effective is more limited so that the potassium hydroxide is preferred.

The hydroxides of potassium, sodium and lithium have the characteristic that if decomposed by electrolysis as an electric current passes through the material between the electrodes, the metallic sodium, potassium or lithium formed at the electrode will immediately recombine with the water present to again form the hydroxide so that the electrolytic material renews itself.

While the hygrometer according to the present invention may be used in any electric circuit to indicate change in humidity by the change in resistance of the electrolytic material between the electrodes, it has been illustrated in connection with a broadcast system used in connection with a meteorological balloon to broadcast to a ground station an audible signal which will indicate the continuous values of humidity as the balloon ascends. This is shown schematically in Figure 1, which indicates the hygrometer electrodes at 2 and 3 connected in the grid circuit in series with a resistance 7, the hygrometer and resistance being in turn in parallel with a condenser 9 and in parallel with a resistor 11. An oscillator tube is indicated at 12, and there are provided the condensers 13 and 14 in the plate and grid circuits which are coupled together through the oscillation transformer 15. The plate load resistor 16 and resistance 17 and condensers 18 and 19 complete an audio-frequency oscillator circuit, the constants of the circuit being such that the tube 12 oscillates at an audible frequency.

The audio-frequency wave generated by the circuit above described is used to modulate the radio frequency wave generated by the oscillator tube 21 in whose circuit there are provided the inductance 22, condensers 23 and 24 and coupling transformer 25 for the antenna 26.

In the circuit of Figure 1, as the hygrometer is exposed to different humidity conditions, the moisture content of the hygroscopic material is changed, and with the moisture content the resistance of the electrolyte is changed to vary the frequency of the output of the audio-frequency oscillator. This audio-frequency modulates the radio frequency of the transmitter and the signal is picked up on the ground as an audible signal which will indicate the humidity of the atmosphere in which the hygrometer is exposed.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In an electrical hygrometer, spaced electrodes and hygroscopic mixture between said electrodes whose moisture content and resistance vary with the humidity of the atmosphere to which it is exposed, said mixture including an electrolyte which, if decomposed under the electrolytic action attending passage of current between the electrodes, will immediately recombine with the elements present in the material to renew the original electrolyte.

2. In an electrical hygrometer, spaced electrodes and a hygroscopic mixture between said electrodes whose moisture contact and resistance vary with the humidity of the atmosphere to which it is exposed, said mixture including a hydroxide of a metal which readily combines with water to produce the hydroxide.

3. In an electrical hygrometer, spaced electrodes and a hygroscopic mixture between said electrodes whose moisture content and resistance vary with the humidity of the atmosphere to which it is exposed, said mixture including a hydroxide of one of the metals of the group potassium, sodium, lithium.

4. In an electrical hygrometer, spaced electrodes and a hygroscopic mixture between said electrodes whose moisture content and resistance vary with the humidity of the atmosphere to which it is exposed, said mixture including sodium hydroxide.

5. In an electrical hygrometer, spaced electrodes and a hygroscopic mixture between said electrodes whose moisture content and resistance vary with the humidity of the atmosphere to which it is exposed, said mixture including potassium hydroxide.

6. In an electrical hygrometer, spaced electrodes and a hygroscopic mixture between said electrodes whose moisture content and resistance vary with the humidity of the atmosphere to which it is exposed, said mixture including lithium hydroxide.

7. In an electrical hygrometer, spaced electrodes and a hygroscopic mixture between said electrodes whose moisture content and resistance vary with the humidity of the atmosphere to which it is exposed, said mixture including glycerine, an adhesive and a hydroxide of a metal of the group potassium, sodium, lithium.

8. In an electrical hygrometer, spaced electrodes and a hygroscopic material disposed between said electrodes whose moisture content and resistance vary with the humidity of the atmosphere to which it is exposed, and coatings on said electrodes of a material capable of absorbing gases evolved at the electrodes.

9. In an electrical hygrometer, spaced electrodes and a hygroscopic material disposed between said electrodes whose moisture content and resistance vary with the humidity of the atmosphere to which it is exposed, and coatings of platinum black on said electrodes for absorbing gases evolved at the electrodes.

10. In an electrical hygrometer, spaced electrodes, a hygroscopic mixture between said electrodes including a hydroxide of a metal of the group potassium, sodium, lithium, and coatings on said electrodes for absorbing gases evolved at the electrodes.

11. In an electrical hygrometer, spaced electrodes, a hygroscopic mixture between said electrodes including a hydroxide of a metal of the group potassium, sodium, lithium, and a coating of platinum black on said electrodes for absorbing gases evolved at the electrodes.

PLACIDO W. ZINGARO.

REFERENCES CITED

The following references are of record in the file of this patent:

UNITED STATES PATENTS

| Number | Name | Date |
|---|---|---|
| 409,365 | Mond et al. | Aug. 20, 1889 |
| 1,182,759 | Emanuel | May 9, 1916 |
| 2,047,638 | Kott | July 14, 1936 |
| 2,237,006 | Koller | Apr. 1, 1941 |
| 2,285,421 | Dunmore | June 9, 1942 |
| 2,295,570 | Dunmore | Sept. 15, 1942 |
| 2,358,406 | Lichtgarn | Sept. 19, 1944 |

OTHER REFERENCES

Norris, "Inorganic Chemistry," 1st edition 1921, paragraphs 601–7 and 617. (Copy in Division 60.)